United States Patent Office 3,463,800
Patented Aug. 26, 1969

3,463,800
ORGANO ALUMINUM-FLUOROACETYLACETON-ATES AND PREPARATION THEREOF
Wolfram R. Kroll, Linden, N.J., assignor to Esso Research and Engineering Company, a corporation of Delaware
No Drawing. Filed July 19, 1967, Ser. No. 654,340
Int. Cl. C07f 5/06; A01n 9/24
U.S. Cl. 260—448                                      17 Claims

ABSTRACT OF THE DISCLOSURE

Organo aluminum fluoroacetylacetonates are prepared by reacting aluminum alkyls with tri- or hexafluoroacetylacetones at low temperatures. The products are useful as polymerization catalysts, reducing agents, germicides and pesticides. They are also active cocatalysts for a number of polymerization and co-polymerization systems.

BACKGROUND

This invention relates to the preparation of organo aluminum tri- or hexafluoroacetylacetonates.

Dialkylaluminum-acetylacetonates are well known aluminum organic chelates which are useful components of polymerization catalysts. For example, in the in situ reaction product of aluminum trialkyls with acetylacetone is particularly suitable for the polymerization of acrylonitrile as described in U.S. Patent No. 3,231,553 to Chiang and for the polymerization of epoxides as described in U.S. Patent No. 3,135,706 to Vandenberg. The dialkyl aluminum acetylacetonate is usually prepared by reacting an aluminum trialkyl with acetylacetone at ordinary temperatures.

When it was attempted to synthesize organo aluminum hexafluoroacetylacetonates by the methods taught by Chiang and Vandenberg, the desired products were not obtained.

SUMMARY

It has now been found that the organo aluminum tri- or hexafluoroacetylacetonates can be prepared and isolated in high purity by carrying out the following reaction in an inert diluent at temperatures between 0° C. and —120° C.

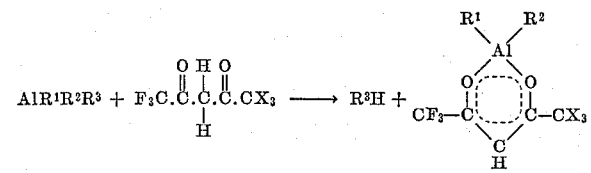

where R¹, R², R³ may be the same or different and may be either halogen or an alkyl group of one to twenty carbon atoms, a phenyl group, a cycloalkyl group having four to six carbon atoms in the ring, or cyclopentadienyl, and X may be hydrogen or fluorine.

The solution of the organo aluminum hexafluoroacetylacetonate can be used without further purification or isolation. Such in situ preparation can be of advantage if the subsequent application in catalysis is also done at low temperatures, e.g. a polymerization of isobutylene in methylchloride at —40° C. In other cases it may be desirable to isolate the organo aluminum fluorochelate. This can be done in a typical case by removal of the diluent.

The diluent is removed from the reaction product at temperatures below 120° C. and preferably below 60° C. and if necessary under vacuum. By carrying out the reaction at the low temperatures, the formation of the organo aluminum fluoroacetylacetonate is faster than competing side reactions and makes the synthesis possible.

If the reaction is not carried out in a 1:1 molar ratio of the reactants as indicated in the above equation, different reaction products are obtained. It has been discovered that reaction of the two moles of hexafluoroacetylacetone with one mole of a trialkylaluminum results in the formation of alkylaluminum-bis-hexafluoroacetylacetonates which are also valuable as catalyst components.

PREFERRED EMBODIMENTS

The following reactions are encompassed by the process of this invention.

(1)
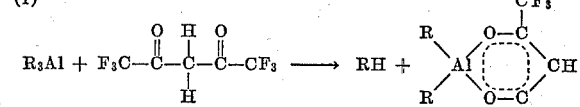

(2)
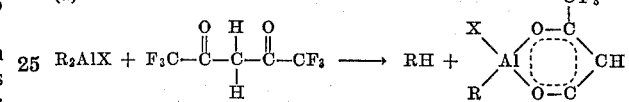

(3)
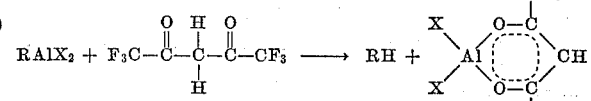

(4)
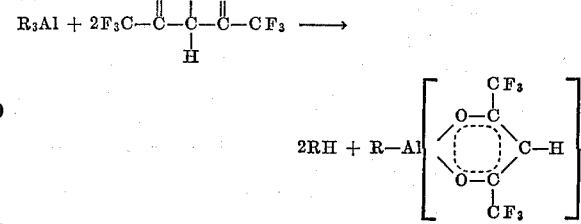

(5) Each of the above reactions in which the fluorinated acetylacetone is

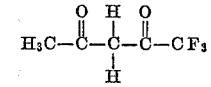

In each of the above reactions R is alkyl of 1 to 20 carbon atoms, or mixtures of alkyl groups of 1 to 20 carbon atoms, phenyl, cycloalkyl of 4 to 6 carbon atoms, cyclopentadienyl and hydrogen and X is chlorine, bromine, fluorine, cyanide, azide, cyanate or thiocyanate.

If R is alkyl in the above reactions a typical Ziegler type growth product can also be used which is obtained by, e.g., reacting triethylaluminum with ethylene.

The organo aluminum compound is first dissolved in a suitable diluent which may be an aliphatic hydrocarbon, such as butane, pentane or hexane; aromatic hydrocarbons such as benzene or toluene, chlorobenzene; ethers, such as methyl or ethyl ether and tetrahydrofuran; tertiary amines, such as trimethyl or triethyl amine, or N-methylmorpholine and N-alkyl piperidine. The trifluoro or hexafluoropentanedione is then added to this solution and the reaction carried out at 0° to —120° C. The reaction is completed after all of the fluorochelate has been added. The solution can be used immediately without further purification or isolation. If isolation of the pure compound is desired great care has to be exercised to avoid thermal decomposition. The pure compounds can be recovered and isolated at temperatures preferably below 60° C.

In case the alkyl group on the aluminum alkyl or aluminum alkyl halide is methyl or ethyl the isolation and purification of the aluminum chelate can be accomplished by freezing out at temperatures below those used for the preparation in a solvent such as pentane.

The aluminum trifluoro or hexafluoroacetylacetonates of this invention are useful as polymerization catalysts, as reducing agents, as germicides and pesticides. They are also very active cocatalysts for a number of polymerization and co-polymerization systems.

In order to illustrate the invention with greater particularity the following specific examples are given, it being understood that they are intended to be only illustrative and not limitative.

Examples 1-3

7.2 g. trimethylaluminum and 100 ml. n-pentane were cooled to −40° C. Under stirring 20.4 g. 1,1,1,5,5,5-hexafluoro-2,4-pentanedione diluted with 100 ml. pentane were added slowly. After one hour the reaction mixture was allowed to come to room temperature. Subsequently the pentane was stripped off at atmospheric pressure. The pure compound was then distilled in vacuo at 55° C. and 153 torr. A yellow liquid was obtained which upon analysis for aluminum, NMR and mass spectra was shown to be the dimethylaluminum hexafluoro-acetylacetonate. The same preparation was also carried out in cyclopentane and chlorobenzene as solvent with the same results.

Example 4

To a solution of trimethylaluminum (1 millimole) in chlorobenzene at room temperature was added slowly under stirring 1 millimole of a 1 molar solution of hexafluoropentanedione in chlorobenzene. After completion of the addition a precipitate appeared which had not been observed in Examples 1-3. Analysis of both the precipitate and the filtered solution indicated that no dimethylaluminum hexafluoropentanedione was present and that different reaction products had formed. This shows that the reaction at room temperature does not represent a route to the preparation of dialkylaluminum hexafluoroacetylacetonates.

Example 5

11.4 g. triethylaluminum and 100 ml. pentane were cooled to −40° C. Subsequently a dilute solution of 20.4 g. hexafluoropentanedione in pentane was slowly added. Following completion of the reaction the product was worked up as described in Example 1. The diethylaluminum hexafluoroacetylacetonate could be distilled at 32° C. and 9 torr. Because of its inherent instability, it had to be kept cool to avoid decomposition.

Example 6

To a solution of 1 millimole triethylaluminum in a mixed solvent of n-butane and chlorobenzene were added at −35° C. one millimole of a chlorobenzene solution of hexafluoropentanedione. After completion of the reaction the butane was removed at −15° C. and 0° C. by vacuum stripping. Subsequent NMR analysis of the solution of the product in the chlorobenzene showed that diethylaluminum hexafluoroacetylacetonate had been formed. This is an example of a preparation in which the product was not isolated. (In situ preparation.)

Example 7

The reaction was carried out as described in Example 6 with the exception that tri-isobutylaluminum was used as the organo-aluminum compound. The NMR analysis confirmed that diisobutylaluminum hexafluoroacetylacetonate had formed.

The nature of the present invention having thus been fully set forth and examples of the same given, what is claimed as new, useful and unobvious and desired to be secured by Letters Patent is:

1. Process for the in situ preparation of an organo-aluminum hexafluoroacetylacetonate having the formula

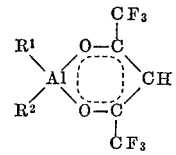

which comprises reacting, in the presence of a solvent, a 1:1 molar ratio of hexafluoroacetylacetone with an organo-aluminum compound having the formula

at a temperature between about −35° C. and −45° C. wherein $R^1$, $R^2$, and $R^3$ are each $C_1$ to $C_{20}$ alkyl, mixtures of said alkyls, a halogen selected from the group consisting of chlorine, bromine and fluorine, or a group selected from cyanide, azide, cyanate, thiocyanate, phenyl, cycloalkyl having 4 to 6 carbon atoms in the ring, cyclopentadienyl, and hydrogen, and recovering a solution of the organo-aluminum hexafluoroacetylacetonate.

2. Process for the preparation of an organo-aluminum hexafluoroacetylacetonate having the formula

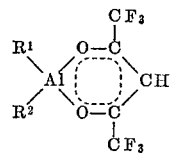

which comprises reacting, in the presence of the solvent, a 1:1 molar ratio of hexafluoroacetylacetone with an organo-aluminum compound having the formula

at a temperature between about −35° C. and −45° C. wherein $R^1$, $R^2$, and $R^3$ are each selected from $C_1$ to $C_{20}$ alkyl and mixtures thereof, halogen selected from the group consisting of chlorine, bromine and fluorine, a group selected from cyanide, azide, cyanate, thiocyanate, phenyl, cycloalkyl having 4 to 6 carbon atoms in the ring, cyclopentadienyl and hydrogen, removing the solvent and recovering an organo-aluminum hexafluoroacetylacetonate.

3. The process of claim 1 in which

is aluminum trimethyl.

4. The process of claim 1 in which

is aluminum triethyl.

5. The process according to claim 1 in which

is aluminum triisobutyl.

6. The process of claim 1 in which

is a growth product obtained by reacting a trialkyl aluminum with ethylene.

7. The process of claim 2 in which

is aluminum trimethyl.

8. The process of claim 2 in which

is aluminum triethyl.

9. The process of claim 2 in which

is aluminum triisobutyl.

10. The process of claim 2 in which

is a growth product obtained by reacting a trialkyl aluminum with ethylene.

11. The process of claim 1 wherein the solvent is selected from the group consisting of paraffins, cycloaliphatic, aromatic and haloaromatic hydrocarbons.

12. The process of claim 2 in which the solvent is selected from the group consisting of paraffins, cycloaliphatic, aromatic and haloaromatic hydrocarbons.

13. The process of claim 2 in which the solvent is removed by subjecting the reaction mixture to sub-atmospheric pressure.

14. The process of claim 2 in which the product is recovered by distillation at sub-atmospheric pressure.

15. Dimethyl aluminum hexafluoroacetylacetonate.
16. Diethyl aluminum hexafluoroacetylacetonate.
17. Di-isobutyl aluminum hexafluoroacetylacetonate.

References Cited

UNITED STATES PATENTS

| 3,076,834 | 2/1963 | Norton | 260—448 XR |
| 3,135,706 | 6/1964 | Vandenberg | 260—2 |
| 3,180,838 | 4/1965 | Chiang | 252—431 |
| 3,208,975 | 9/1965 | Vandenberg | 260—67 |

OTHER REFERENCES

Inorg. Chem., vol. 2, p. 693 (1963).

Chem. Abstracts, vol. 64, p. 6675d (1966) (corres. articles from Angew. Chem. Inter. ed. in English, vol. 4, p. 954 (1965) and J. Amer. Chem. Soc., vol. 86, p. 5016 (1964).

TOBIAS E. LEVOW, Primary Examiner

H. M. S. SNEED, Assistant Examiner

U.S. Cl. X.R.

252—431; 260—94.8, 999